United States Patent Office 3,220,185
Patented Nov. 30, 1965

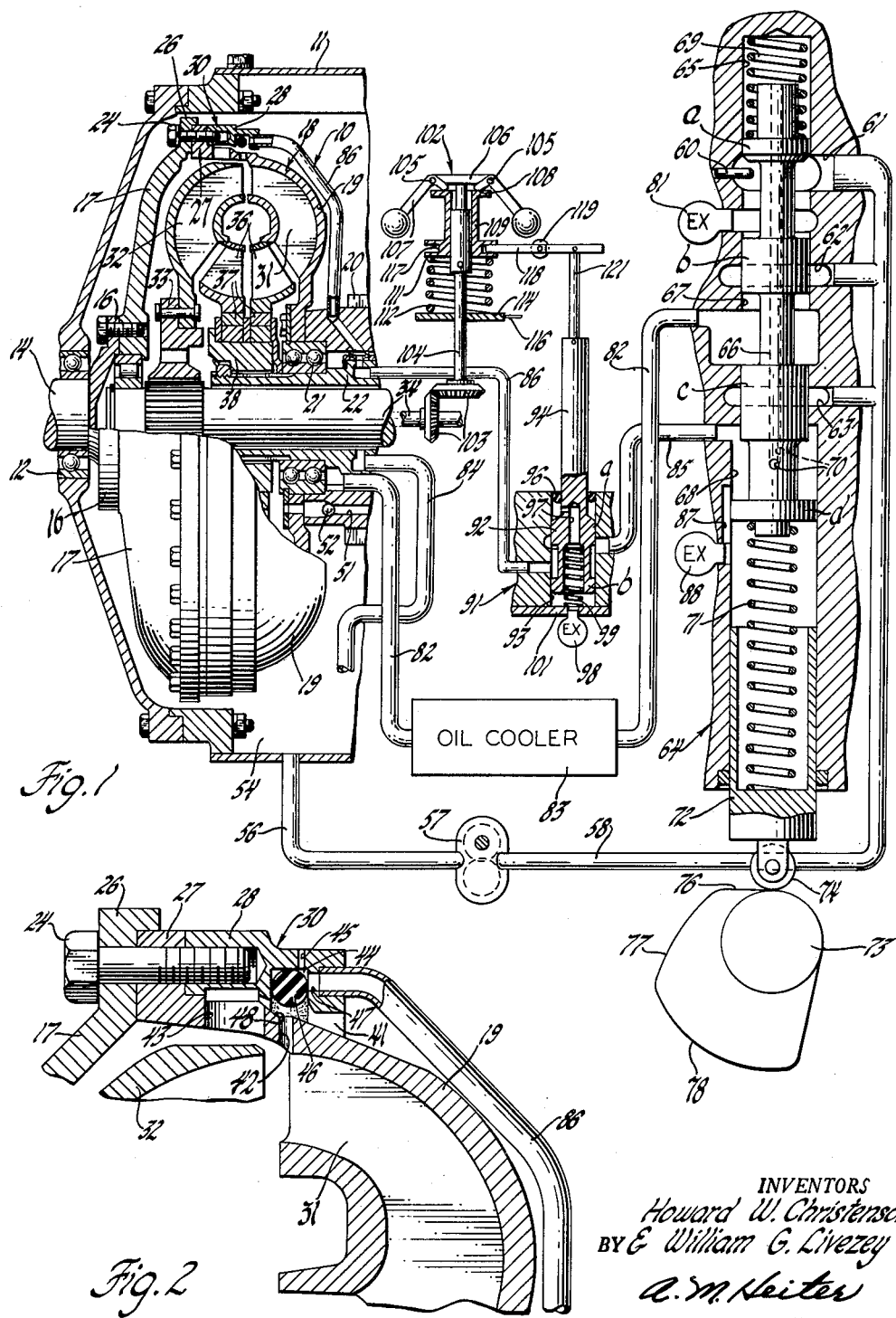

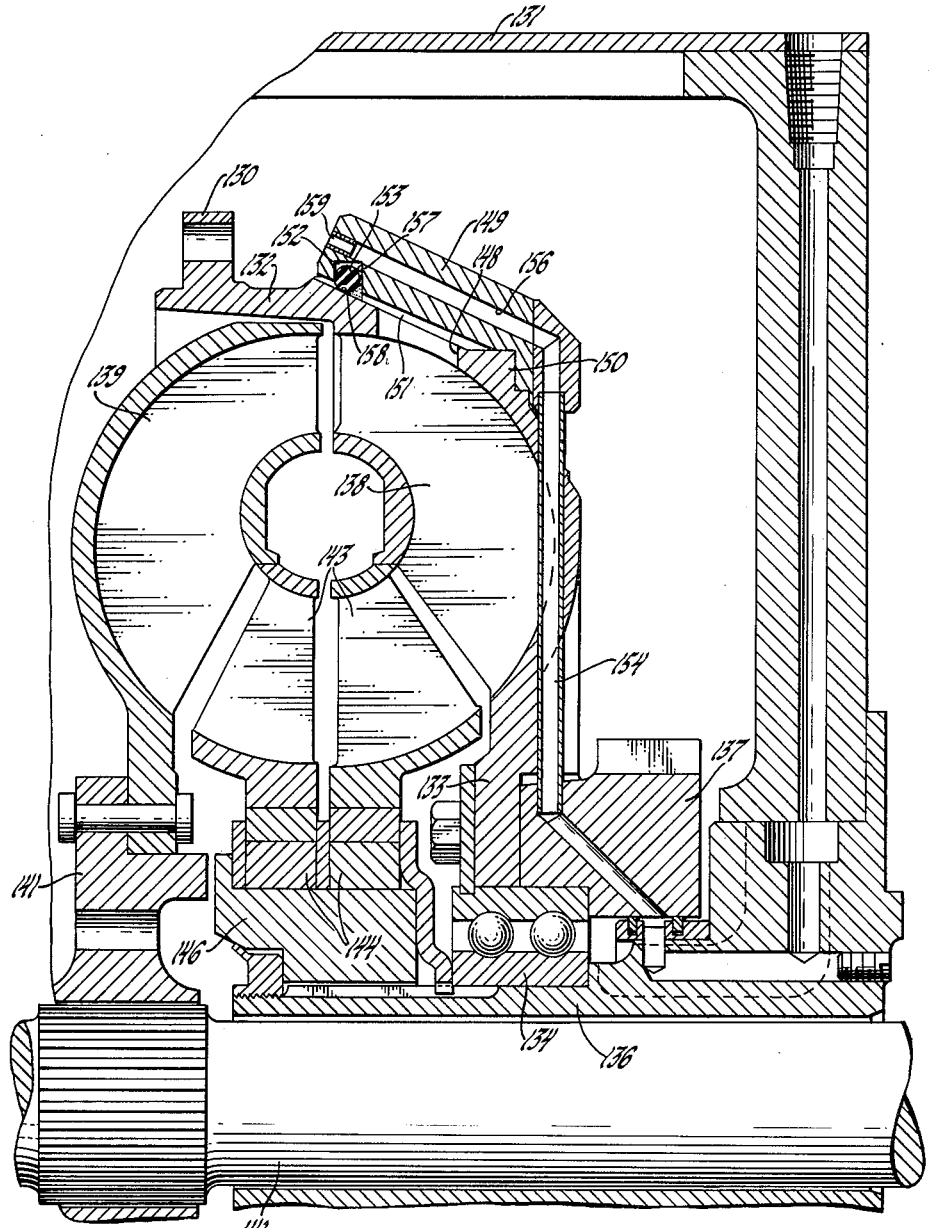

3,220,185
TRANSMISSION
Howard W. Christenson and William G. Livezey, Indianapolis, Ind., assignors to General Motors Corporation, Detroit, Mich., a corporation of Delaware
Filed May 9, 1961, Ser. No. 108,860
16 Claims. (Cl. 60—54)

This invention relates to a transmission and particularly a torque converter transmission having a control system to control the amount of fluid in the torque converter operating chamber.

The torque converter has a pump element driven by the input shaft, a turbine element connected to drive the output shaft, and a stator located within a housing. At the outer perimter of the housing which confines the working fluid in the torque converter operating chamber, there is a plurality of passages, extending substantially completely around the outer perimeter of the housing to provide high flow capacity. An annular elastic seal member, such as an O-ring, is located and sealed in an annular groove. When a control pressure is supplied to the base of the annular groove behind the O-ring, the O-ring is forced radially inwardly to seal the outlet passage from the torque converter. When the control pressure is released, centrifugal force and the fluid pressure in the torque converter operating chamber expand the O-ring to open the outlet passage to permit rapid dumping of the torque converter operating chamber.

This quick acting torque converter dump valve may be manually or automatically controlled to vary the level or volume of fluid in the torque converter operating chamber to control the output speed of the torque converter to obtain a selected speed or constant speed operation. The output speed of the torque converter may thus be controlled by controlling the pressure of the control fluid supplied to the dump valve so that the dump valve will open in response to a predetermined pressure within the torque converter operating chamber indicative of the predetermined volume of fluid in the operating chamber. The dump valve may also be operated by an output governor controlling the supply of control fluid to the dump valve to open and close the dump valve to obtain constant speed operation.

An object of the invention is to provide in a torque converter, having a high volume output passage from the torque converter operating chamber to the sump, an elastic annular valve member operatively controlled in response to a control force to open and close the outlet passage.

Another object of the invention is to provide in a torque converter, having an operating chamber with a substantially annular passage connecting the working chamber to a sump extending substantially completely around the perimeter of the housing, an annular elastic valve member located in a groove and fluid pressure means supplied to the groove to control the elastic valve closure member.

Another object of the invention is to provide in a torque converter a dump valve biased to an open position to exhaust fluid from the operating chamber by the fluid pressure in the torque converter operating chamber and moved to a closed position by a control fluid pressure to control the output speed.

Another object of the invention is to provide in a torque converter an annular elastic dumping valve biased to an open position permitting exhaust of fluid pressure from the torque converter operating chamber and biased to a closed position by a variably controlled fluid pressure to control the torque converter output speed.

These and other objects of the invention will be more apparent from the following description and drawing of the preferred embodiments of the invention.

FIGURE 1 is a schematic showing of a dumping torque converter and control system.

FIGURE 2 is a partial enlargement of a torque converter showing the dump valve.

FIGURE 3 shows a torque converter having a modified dump valve.

The invention is illustrated in a torque converter and control system shown in FIGURE 1. The torque converter 10 is located in a stationary housing 11 having a bearing 12 to rotatably support the input shaft 14. The input shaft has a flange 16 connected to drive the forward wall 17 of a rotatable torque converter housing 18. The housing 18 also has a rear portion 19 having a hub and gear portion 20 rotatably supported by a bearing 21 on a ground sleeve 22 which is fixed to the housing 11.

The torque converter housing assembly 18 consisting of the front wall portion 17 and rear wall portion 19 is suitably secured together by a screw 24 passing through apertures in the flange 26 of the front wall 17 and the flange 27 and rear wall 19 and secured in threaded bores in the annular valve member 28. A pump bladed member 31 is mounted on the rear wall 19. A turbine or output bladed member 32 is connected to the output hub 33 which is suitably splined to the output shaft 34. The dual stators 36 are connected by suitable one-way brakes 37 to the stator hub 38 which is splined to the ground sleeve 22.

The annular valve member 28, as shown in detail in FIGURE 2, is sealed to flange 27 and is spaced from the outer surface of the rear wall 19 to provide an annular passage 41. This construction provides a high volume fluid exhaust passage from the interior of the housing 18 through an annular series of small openings 42 and an annular series of large openings 43 and the annular passage 41 to the sump 54. The valve member 28 also has an annular recess 44 extending radially outwardly from the annular series of small holes 42, in which the annular rubber valve ring 46, formed of rubber having a durometer of ninety, or other elastic plastic material of limited deformability, is located. A port 47 is connected to the bottom of recess 44 so that fluid may be supplied through the port 47 to the radially outer side of the valve ring 46 to move the valve ring inwardly to engage an annular seating surface 48 on the exterior surface of housing 18 and sufficiently wide to provide sealing all around the apertures 42. An orifice 45 permits exhaust of signal line 86 to release the centrifugal pressure head in line 86 to permit release of the valve ring 46 when the supply of signal pressure to line 86 is discontinued. When the valve ring 46 is closed or sealed, it engages the seat 48 to provide an annular seal completely around the housing and engages the side wall surfaces of groove 44 to provide an annular seal to member 28, to completely block flow from the operating chamber of the torque converter through apertures 43 by blocking the annular passage 41. In order to prevent a vacuum occurring in the working chamber of the torque converter when fluid is dumped or exhausted therefrom, an air vent passage 51 connects the atmosphere to the operating chamber to permit air to enter the chamber when fluid is exhausted via the dump valve. The check valve 52 in this passage prevents the exhaust of fluid through the air vent passage 51 when the operating chamber is filled with fluid, or under pressure since air can escape through a free ball check valve but fluid or oil will close the valve.

The lower portion of transmission housing 11 provides a sump 54 which is connected by pump inlet line 56 to the input driven pump 57 which may be driven by gear 20. Fluid under pressure is supplied by the pump via main line 58 to the inlet ports 61, 62 and 63 of the main control valve 64. Valve 64 has a valve element 66 having lands $a$, $b$ and $c$ of equal diameter located in a bore 67 and a larger land $d$ located in the larger bore 68. Stop pin 60 limits movement of the valve element. The end of the bore 67, adjacent land $a$, is closed to provide a chamber 65. A spring 69 in chamber 65 biases the valve toward the exhaust position. A passage 70 connects the space between lands $c$ and $d$ through the valve element to supply fluid at regulated pressure to the chamber 65 to act on the unbalanced area of land $a$. The main biasing spring 71 engages the other end of the valve at land $d$ and a controlled abutment 72 which is moved to vary the biasing force of this spring opposing the fluid force on the valve element. The position of control element 72 may be set by rotating the cam 73 which engages a cam follower 74 on the control element 72. The cam 73 has an initial fast rise portion 76 to take up slack in the spring and apply a low initial pressure value and thereafter there is a cam portion 77 having a gradual rise to provide a controllable variable pressure value and a final circular cam portion 78 providing the final high pressure value. The valve is shown in the inoperative or exhaust position wherein the fluid supply port 61 is connected between the lands $a$ and $b$ to the exhaust 81. The port 62 is blocked by the land $b$ so fluid is not supplied via line 82, cooler 83 to the torque converter operating chamber. Port 63 is blocked by the land $c$ so fluid is not supplied to the signal lines 85–86. The signal line 85–86 is connected via bore 68 and port 87 to exhaust 88.

When the cam 73 is moved increasing the biasing force of spring 71, valve element 66 will move to the open position, first connecting port 62 between lands $b$ and $c$ to the converter supply line 82. Since exhaust 81 remains open, this pressure in line 58 at valve 64 is substantially zero and there is no substantial flow to line 82 and the converter. Thereafter on further movement, exhaust 81 is closed and simultaneously port 63 is connected between the lands $c$ and $d$ to the signal line 85. The pressure supplied to the signal line 85 will act on the unbalanced area of land $d$ and via passage 70 on the area of land $a$ to oppose the biasing spring 71 to connect main line to exhaust 81 or signal line 85 to regulate the pressure at a value determined by the biasing force of spring 71 which is variably controlled by the position of cam 73. At this time, the pressure in the converter supply line 82 at valve 64 will also be raised to substantially the same value to provide flow to the converter to fill the converter.

The signal lines 85–86 are normally connected by control valve 91 having a valve element 92 having lands $a$ and $b$ located in bore 93. Valve element 92 has a stem 94 extending out of bore 93 through a seal 96. A passage 97 extending from a point above land $a$ to the other end of the valve beyond land $b$ connects the space between seal 96 and land $a$ to the exhaust 98. A light spring 99 between the valve element 92 and an abutment 101 at the lower end of the valve bore 93 urges the valve to the closed position reducing or blocking the supply of fluid to signal line portion 86.

Valve 91 is controlled by a governor 102 driven from the output shaft 34 by a pair of drive gears 103 which drive the governor shaft 104 at a speed proportional to the output shaft. The governor mechanism includes shaft 104 having a cross-head 106 on which the weighted levers 107 are pivotally mounted by pivots 105. The levers 107 have a camming surface 108 pushing the sleeve 109 downwardly as the weighted levers 107 move outwardly with increasing speed. Sleeve 109 has at its lower end an abutment 111 engaging the spring 112 which also abuts the adjustable abutment member 114 which may be moved by a manual control 116 to any one of a plurality of positions to change the speed control position of sleeve 109 or the governing speed of the governor. Sleeve 109 has in its outer edge a recess 117 to provide a pivotal connection to the control lever 118 which is pivoted to a fixed support by the pin 119. The lever 118 is also pivotally connected to a rod 121 pivotally connected to the stem 94 of valve 92 to control the valve in accordance with the speed of the output shaft.

*Operation*

With the main control valve 64 in a closed position connecting main line 58 to exhaust 81, fluid is not supplied via line 82 to the torque converter operating chamber. The chamber is connected to exhaust via the space between the output shaft 34 and ground sleeve 22 and line 84 to sump 54. In order to make the transmission effective to transmit power from the input shaft to the output shaft, control cam 73 is rotated so that the quick rise portion 76 moves past follower 74 and an initial portion of slow rise portion 77 engages the follower to quickly move control member 72 to take up slack and provide an initial supply of fluid from line 58 and port 62 to the torque converter supply line 82 and to regulate the pressure of fluid supplied from port 63 to signal line 85 at a constant low valve. Pressure supplied to the torque converter signal line 85 will be regulated by the valve 64 at a pressure determined by the position of cam 73 and the degree of movement of control member 72 to increase the biasing force of spring 71. This pressure is varied by cam movement due to the gradual rise of cam portion 77. Pressure will be regulated by directing excess fluid to exhaust 81. The pressure directed by signal line 85 to groove 44 of the dump valve 30, closes the dump valve. By varying the pressure in line 85–86 acting to close the dump valve 30, in accordance with the manual position of cam 73, dump valve 30 controls the fluid level in the torque converter operating chamber to control the output speed of the torque converter. The pressure in the torque converter operating chamber acting through ports 42 to urge the dump valve ring 46 to open position varies with the volume of fluid in the converter and the input speed which is assumed to be substantially constant. Thus a particular signal pressure will close and hold the dump valve closed against a predetermined volume of fluid in the operating chamber. Excess fluid in the operating chamber will provide an increased pressure to open the dump valve to reduce the volume of fluid. Thus the dump valve controls the rate of exhaust in relation to the rate of supply of fluid to control the volume of fluid in the converter operating chamber at a predetermined speed set by the position of cam 73. The cam 73 may thus be operated in the position shown to disconnect the drive, to provide a variable degree of converter fill and thus output speed when cam arc 77 engages follower 74 and to provide a full converter chamber or full drive when cam arc 78 engages follower 74.

When the cam 73 is in the high position of the cam surface 78 engaging cam follower 74, the main control valve 64 provides maximum oil flow to the torque converter operating chamber and substantially constant high pressure to the signal line 85. This pressure may be controlled by output governor 102 actuating the governor valve 91 up to reduce or block the supply of fluid from line 85 in response to output overspeed conditions to allow fluid in the torque converter chamber to open dump valve 30 to decrease the volume of fluid in the torque converter operating chamber to unload the engine to decrease the output speed. Conversely output underspeed conditions move the valve down to open position to provide flow to the line 86 closing the dump valve 30 to increase the volume of fluid in the torque converter operating chamber to load the engine and increase output speed. This constant speed control of torque converter output may be set at any desired speed value by adjusting the position of spring abutment 114 by means of a manual control 116.

The modified torque converter shown in FIGURE 3 located in the transmission housing 131 has an input shaft and forward wall (not shown) similar to the input shaft 14 and forward wall 17 in FIGURE 1. The forward wall is secured to the flange 130 of rear wall portion 132 which has a hub portion 133 rotatably mounted on the bearing 134 supported on the ground sleeve 136. Hub portion 133 is attached to a gear 137. The rear wall 132 has formed therewith the pump element 138 having blades and an inner shroud. The turbine member 139 having blades and an outer and inner shroud is connected by the output hub 141 to the output shaft 142. The stators 143 having blades and inner and outer shrouds are connected by one-way clutches 144 to the stator hub 146 which is secured by suitable splines to the ground sleeve 136. The rear wall portion 132 adjacent the pump outlet is proveded with an annular series of large apertures 148. An annular valve housing 149 is mounted against and sealed to a flange 150 and secured by screws (not shown) to the wall 132 in spaced relation to provide an annular passage 151 connecting the torque converter operating chamber outlet apertures 148 to the space between the torque converter and the transmission housing 131 and thus to sump at the base of housing 131. This outlet passage, like the outlet passage shown in FIGURE 2, provides a high rate of flow, since apertures 148 are large enough so that flow to annular passage 151 is unrestricted and the annular passage 151 provides a very high volume valve opening. Valve member 149 has an annular recess 152 in which the annular circular elastic valve ring element 153 is located. A signal pressure passage 154 is provided through the rear wall member 132 which is connected to a passage 156 in the valve member 149 to supply fluid via port 157 to the base of recess 152 to urge the valve ring 153 radially inwardly against the sealing surface 158 on the outer surface of rear wall 132 to close the annular passage 151. The terminal portion of passage 156 has an orifice 159 to permit exhaust of fluid in line 154–156 when the supply is cut off.

The above described preferred embodiments are illustrative of the invention and it will be appreciated that they may be modified within the scope of the appended claims.

We claim:
1. In a fluid drive transmission;
(a) a rotary housing mounted for rotation about an axis providing a fluid drive operating chamber;
(b) input means connected to drive said rotary housing;
(c) pump means driven by said rotary housing;
(d) output means;
(e) turbine means located in said operating chamber connected to drive said output means;
(f) means to supply fluid to said operating chamber;
(g) dump valve means including an outlet passage extending from said operating chamber through said rotary housing to discharge fluid from said rotary housing, and a member positioned to seal said outlet passage in one position and to open said outlet passage in another position;
(h) and means to variably bias said member from the closed to the open position proportional to the volume of fluid in said operating chamber;
(i) an controllable regulator means connected to said dump valve means and having a movable control device and operative in response to movement of said control device to apply a fluid pressure regulated at gradually varying values in proportion to movement of said control device to said member to urge said member from said open to said closed position to variably control the volume of fluid in said operating chamber in proportion to the movement of said control device.

2. In a fluid drive transmission;
(a) a rotary housing mounted for rotation about an axis providing a fluid drive operating chamber;
(b) input means connected to drive said rotary housing;
(c) pump means driven by said rotary housing;
(d) output means;
(e) turbine means located in said operating chamber connected to drive said output means;
(f) means to supply fluid to said operating chamber;
(g) dump valve means located at an outer diameter of said rotary housing including an outlet passage extending from said operating chamber through said rotary housing to discharge fluid outside of said rotary housing, a valve member movably mounted to seal said outlet passage in one position and to open said outlet passage in another position, said valve member being positioned to be biased to said open position, means for biasing said valve member to said open position in response to the fluid pressure in said operating chamber;
(h) and control means connected to said dump valve means having a moveable control device and operative in response to movement of said movable control device to supply a fluid pressure regulated at gradually varying values in proportion to movement of said control device to said dump valve means to bias said member from said open to said closed position to variably control the volume of fluid in said operating chamber in proportion to the movement of said control device.

3. The invention defined in claim 2 and said control means including governor means controlling the supply of fluid to bias said valve member of said dump valve means in accordance with the speed of the output shaft to control output speed.

4. In a fluid drive transmission;
(a) a rotary housing mounted for rotation about an axis providing a fluid drive operating chamber;
(b) input means connected to drive said rotary housing;
(c) pump means in said operating chamber driven by said rotary housing;
(d) output means;
(e) turbine means located in said operating chamber connected to drive said output means;
(f) means to supply fluid to said operating chamber;
(g) dump valve means on said rotary housing includin an outlet passage extending from the radial outer portion of said operating chamber through said rotary housing to discharge fluid from said rotary housing having a passage portion having an annular cross section coaxial with said rotary housing and located at the radial outer portion of said rotary housing, and valve means movably positioned to seal said passage portion in one position and to open said passage portion throughout the circumference of said annular cross section in another position;
(h) and means to move said valve means between said open and closed positions.

5. In a fluid drive transmission;

(a) a rotary housing mounted for rotation about an axis providing a fluid drive operating chamber;
(b) input means connected to drive said rotary housing;
(c) pump means in said operating chamber driven by said rotary housing;
(d) output means;
(e) turbine means located in said operating chamber connected to drive said output means;
(f) means to supply fluid to said operating chamber;
(g) and dump valve means on said rotary housing including an outlet passage extending from the radially outer portion of said operating chamber through said rotary housing to discharge fluid from said rotary housing, having a passage portion having an uninterrupted annular cross section coaxial with said housing located at the radial outer portion of said housing, and an annular valve member positioned to rotate with said rotary housing and movably mounted for movement from one position sealing said passage portion to another position opening said passage portion throughout the circumference of said annular cross section;
(h) and means acting on said annular valve member to move said valve member to said open and said closed positions.

6. In a fluid drive transmission;
(a) a rotary housing mounted for rotation about an axis providing a fluid drive operating chamber;
(b) input means connected to drive said rotary housing;
(c) pump means in said operating chamber driven by said rotary housing;
(d) output means;
(e) turbine means located in said operating chamber connected to drive said output means;
(f) means to supply fluid to said operating chamber;
(g) dump valve means on said rotary housing including an outlet passage extending from the radially outer portion of said operating chamber through said rotary housing to discharge fluid from said rotary housing, and having a passage portion having an uninterrupted annular cross section coaxial with said rotary housing and located at the radial outer portion of said rotary housing, and an elastic ring member movably positioned to seal said passage portion in one position and to open said passage portion throughout the circumference of said annular cross section in another position;
(h) means to apply a force to said ring member proportional to the pressure in said operating chamber to urge said ring member from said closed to said open position;
(i) and means to apply a controlled pressure to said ring member to urge said ring member from said open to said closed position.

7. In a fluid drive transmission;
(a) a rotary housing mounted for rotation about an axis providing a fluid drive operating chamber;
(b) input means connected to drive said rotary housing;
(c) pump means in said operating chamber driven by said rotary housing;
(d) output means;
(e) turbine means located in said operating chamber connected to drive said output means;
(f) means to supply fluid to said operating chamber;
(g) dump valve means on said rotary housing including an outlet passage extending from the radial outer portion of said operating chamber through said rotary housing to discharge fluid from said rotary housing, having a passage portion having an annular cross section coaxial with said rotary housing and located at the radial outer portion of said rotary housing, the flow area of all parts of said outlet passage being at least as large as the flow area of said annular cross section of said passage portion, and annular valve means movably positioned to seal said passage portion in one position and to open said passage portion throughout the circumference of said annular cross section in another position;
(h) and control means to move said valve means between said open and closed positions.

8. The invention defined in claim 7;
(a) and said valve means being an elastic ring;
(b) and said control means including fluid pressure supply means connected to apply fluid pressure to said elastic ring.

9. In a fluid drive transmission;
(a) a rotary housing mounted for rotation about an axis providing a fluid drive operating chamber;
(b) input means connected to drive said rotary housing;
(c) pump means in said operating chamber driven by said rotary housing;
(d) output means;
(e) turbine means located in said operating chamber connected to drive said ouput means;
(f) means to supply fluid to said operating chamber;
(g) dump valve means on said rotary housing including an outlet passage extending from the radial outer portion of said operating chamber through said rotary housing to discharge fluid from said rotary housing, having a passage portion having an annular cross section extending to guide flow substantially coaxial with said rotary housing and located at the radial outer portion of said rotary housing, annular valve means mounted for movement transverse to said passage portion to seal said passage portion in one position and to open said passage portion throughout the circumference of said annular cross section in another position, and the flow area of all parts of said outlet passage being at least as large as the flow area of said annular cross section with said annular valve means in said open position;
(h) and means to move said valve means between said open and closed positions.

10. In a fluid drive transmission;
(a) a rotary housing mounted for rotation about an axis and providing a fluid drive operating chamber;
(b) input means connected to drive said rotary housing;
(c) pump means in said operating chamber driven by said rotary housing;
(d) output means;
(e) turbine means in said operating chamber connected to drive said output means;
(f) means to supply fluid to said operating chamber;
(g) dump valve means on said rotary housing including an outlet passage extending from the radial outer portion of said operating chamber through said rotary housing to discharge outside of said rotary housing, said outlet passage having a passage portion having an uninterrupted annular cross section defined by circular walls extending axially of said rotary housing and located coaxial with said rotary housing at the radially outer portion of said rotary housing, an annular recess extending transversely from one of said walls of said passage portion of said outlet passage and having side surfaces and a base surface, said passage portion being connected to said operating chamber on one side of said recess and and to the outside of said rotary housing on the other side of said recess, annular seat means on the other of said walls opposite said recess, and an elastic ring member movably fitting in said recess in sealing engagement with the side surfaces of said recess for movement between a closed position engaging said seat means and an open position opening said passage portion throughout the circumference of said annular seat means;

(h) means to supply fluid to said recess between said ring member and said base surface to move said ring member to said open position;

(i) and control means to move said ring member to said open position.

11. The invention defined in claim 10;

(a) and said control means including passage means connecting said operating chamber to said seat means to act on said ring member in said closed position to bias said ring member to open position.

12. In a fluid drive transmission;

(a) a rotary housing mounted for rotation about an axis and providing a fluid drive operating chamber;

(b) input means connected to drive said rotary housing;

(c) pump means in said operating chamber driven by said rotary housing;

(d) output means;

(e) turbine means in said operating chamber connected to drive said output means;

(f) means to supply fluid to said operating chamber;

(g) dump valve means on said rotary housing including an outlet passage extending from the radial outer portion of said operating chamber through said rotary housing to discharge fluid outside of said rotary housing, and having a passage portion coaxial with said rotary housing and located at the radial outer portion of said rotary housing having an uninterrupted annular cross section defined by inner and outer circular walls connected at one end to said operating chamber and at the other end to the outside of said rotary housing, an annular recess extending transversely from said outer wall between the ends of said passage portion of said outlet passage having side surfaces and a base surface, annular seat means on said inner wall opposite said recess, an elastic ring member fitting in said recess in sealing engagement with the side surface to provide an expansible chamber in said recess between said ring member and base surface and movable between an open position opening said passage portion throughout the circumference of said annular cross section and a closed position engaging said seat means and closing said passage portion;

(h) means to supply fluid to the expansible chamber in said recess to move said ring member to said open and closed positions;

(i) and control means to move said ring member to said open position.

13. In a fluid drive;

(a) a rotary housing providing an operating chamber;

(b) input means connected to drive said rotary housing;

(c) pump means in said operating chamber driven by said rotary housing;

(d) output drive means;

(e) turbine means in said operating chamber connected to said output drive means;

(f) means to supply fluid to said operating chamber;

(g) a dumping valve having an annular member located at a radial outer portion of said housing with one side sealed to the external surface of said housing and the remainder in spaced relation to provide an annular passage having an annular cross section between the external surface of said rotary housing and the facing surface of said annular member closed at said one side and open at the other side, an annular series of ports in said rotary housing connecting said operating chamber to said annular passage adjacent the closed side, an annular groove in said valve member opening to said annular passage between said ports and said opened side, sealing means on said external surface of said rotary housing opposite said groove, and an annular valve ring located in said groove in sealed relation to walls thereof and movable from an open position permitting flow through said annular passage to a closed position engaging said sealing means to block said annular passage;

(h) means to supply pressure to the base of the groove to move said valve ring from open to closed position;

(i) and means to bias said valve ring to move from closed to open position.

14. In a fluid drive;

(a) a rotary housing providing an operating chamber;

(b) input means connected to drive said rotary housing;

(c) pump means in said operating chamber and driven by said rotary housing;

(d) output drive means;

(e) turbine means in said operating chamber and connected to said output drive means;

(f) means to supply fluid to said operating chamber;

(g) a dumping valve having an annular member located at a radial outer portion of said housing with one side sealed to the external surface of said housing and the remainder in spaced relation to provide an annular passage extending axially and having an uninterrupted annular cross section between the inner surface of said annular member and the external surface of said rotary housing closed at said one side and open at the other side, an annular series of ports in said rotary housing connecting said operating chamber to said annular passage adjacent the closed side, the flow area of said ports being larger than the flow area of said annular passage, an annular groove in said valve member opening to said annular passage between said ports and said opened side, sealing means on said external surface of said rotary housing opposite said groove, and an annular expansible valve ring located in said groove in sealed relation to walls thereof and movable from an open position permitting flow through said annular passage to a closed position engaging said sealing means to block said annular passage;

(h) means to supply pressure to the base of the groove to move said valve ring from open to closed position;

(i) and biasing means to bias said valve ring to move from closed to open position.

15. The invention defined in claim 14;

(a) and said biasing means including, passage means in the outer wall of said rotary housing connecting said operating chamber pressure to act on said valve ring in said closed position to bias said valve ring to the open position.

16. In a fluid drive transmission;

(a) a rotary housing mounted for rotation about an axis providing a fluid drive operating chamber;

(b) input means connected to drive said rotary housing;

(c) pump means in said operating chamber driven by said rotary housing;

(d) output means;

(e) turbine means located in said operating chamber connected to drive said output means;

(f) means to supply fluid to said operating chamber;

(g) dump valve means on said rotary housing including an outlet passage extending from the radial outer portion of said operating chamber through said rotary housing to discharge fluid from said rotary housing, having a passage portion having an uninterrupted annular cross section coaxial with said rotary housing and located at the radial outer portion of said rotary housing, an elastic ring member positioned to seal said passage portion in closed position and to open said passage portion throughout the circumference of said annular cross section in open position;

(h) and governor means connected to said output means and operative to apply fluid pressure to said ring member and operative in response to said output means speed to move said ring member between said open and closed positions to control output speed.

References Cited by the Examiner
UNITED STATES PATENTS

| | | | |
|---|---|---|---|
| 808,655 | 1/1906 | Harvey | 60—52 |
| 1,873,688 | 8/1932 | Walker | 60—54 |
| 2,049,673 | 8/1936 | Starr | 60—54 X |
| 2,141,305 | 12/1938 | Kosters | 60—54 |
| 2,186,956 | 1/1940 | Canaan | 60—54 |
| 2,195,561 | 4/1940 | Dickerson. | |
| 2,325,090 | 7/1943 | Alison | 60—54 |
| 2,343,786 | 3/1944 | Martin | 60—54 |
| 2,353,143 | 7/1944 | Bryant | 137—525 X |
| 2,392,120 | 1/1946 | Carlson | 60—54 |
| 2,671,466 | 3/1954 | Conrad | 137—525 X |
| 3,116,608 | 1/1964 | Margolin | 60—54 |

JULIUS E. WEST, *Primary Examiner.*